United States Patent
Tiwari et al.

(10) Patent No.: US 10,356,155 B2
(45) Date of Patent: Jul. 16, 2019

(54) SERVICE ONBOARDING

(71) Applicant: Suse LLC, Wilmington, DE (US)

(72) Inventors: Arvind Tiwari, Fort Collins, CO (US); Jason Rouault, Fort Collins, CO (US); Venkateswaran Tharuvai Sundaram, For Collins, CO (US)

(73) Assignee: Suse LLC, Wilmington, DE (US)

( * ) Notice: Subject to any disclaimer, the term of this patent is extended or adjusted under 35 U.S.C. 154(b) by 110 days.

(21) Appl. No.: 15/120,424

(22) PCT Filed: Apr. 30, 2014

(86) PCT No.: PCT/US2014/036197
§ 371 (c)(1),
(2) Date: Aug. 19, 2016

(87) PCT Pub. No.: WO2015/167541
PCT Pub. Date: Nov. 5, 2015

(65) Prior Publication Data
US 2017/0019455 A1  Jan. 19, 2017

(51) Int. Cl.
*H04L 29/06* (2006.01)
*H04L 29/08* (2006.01)

(52) U.S. Cl.
CPC .......... *H04L 67/02* (2013.01); *H04L 63/102* (2013.01); *H04L 67/10* (2013.01); *H04L 67/306* (2013.01)

(58) Field of Classification Search
CPC ....... H04L 67/02; H04L 63/102; H04L 67/10; H04L 67/306
USPC .......................................... 709/226; 717/120
See application file for complete search history.

(56) References Cited

U.S. PATENT DOCUMENTS

| | | | |
|---|---|---|---|
| 7,330,971 B1 * | 2/2008 | Kukreja | ............... H04L 63/083 709/203 |
| 7,680,935 B2 * | 3/2010 | Szyperski | ............... G06F 9/54 709/204 |
| 8,448,170 B2 | 5/2013 | Wipfel et al. | |

(Continued)

FOREIGN PATENT DOCUMENTS

| | | |
|---|---|---|
| JP | 2012138078 A | 7/2012 |
| JP | 2012138078 A | 7/2012 |
| WO | WO-2015167541 A2 | 11/2015 |

OTHER PUBLICATIONS

Alcatel-Lucent.com, Network Functions Virtualization—Challenges and Solutions, Oct. 22, 2012, Strategic White Paper, 20 pages.

(Continued)

*Primary Examiner* — Vivek Srivastava
*Assistant Examiner* — Binod J Kunwar
(74) *Attorney, Agent, or Firm* — Schwegman Lundberg & Woessner, P.A.

(57) ABSTRACT

Service onboarding can include registering an artifact of a service with a control service. Service onboarding can include assigning a credential to a service account associated with a service, wherein the credentials include a limited authorization. Service onboarding can include managing, according to the authorization, a service based on a node attribute definition maintained by an infrastructure automation framework, the framework including a component to call a representational state transfer (REST) application program interface (API) of the control service.

14 Claims, 4 Drawing Sheets

(56) References Cited

U.S. PATENT DOCUMENTS

| | | | |
|---|---|---|---|
| 9,032,303 B2* | 5/2015 | Hall | H04L 67/025 709/203 |
| 9,075,788 B1* | 7/2015 | Roth | G06F 11/3006 |
| 9,112,749 B2* | 8/2015 | Dabbiere | H04L 29/08 |
| 9,122,841 B2* | 9/2015 | Pavlov | G06F 21/00 |
| 9,172,621 B1* | 10/2015 | Dippenaar | H04L 41/18 |
| 9,231,819 B2* | 1/2016 | Pasternak | H04L 29/08099 |
| 9,569,328 B2* | 2/2017 | Pavlov | G06F 11/302 |
| 9,612,815 B1* | 4/2017 | Jagtap | G06F 8/61 |
| 2008/0222631 A1* | 9/2008 | Bhatia | G06F 11/3604 717/178 |
| 2012/0036397 A1* | 2/2012 | Balani | G06F 11/079 714/38.11 |
| 2012/0072985 A1 | 3/2012 | Davne et al. | |
| 2012/0102539 A1* | 4/2012 | Robb | G06F 21/6218 726/1 |
| 2012/0110651 A1* | 5/2012 | Van Biljon | G06Q 30/04 726/4 |
| 2013/0019235 A1* | 1/2013 | Tamm | G06F 8/65 717/170 |
| 2013/0132933 A1* | 5/2013 | Rajaram | G06F 11/3636 717/126 |
| 2013/0151317 A1 | 6/2013 | Charfi et al. | |
| 2013/0152169 A1* | 6/2013 | Stuntebeck | H04L 67/16 726/4 |
| 2013/0239166 A1* | 9/2013 | MacLeod | G06F 21/6218 726/1 |
| 2014/0052877 A1 | 2/2014 | Mao | |
| 2014/0074539 A1 | 3/2014 | Doering et al. | |
| 2014/0075019 A1* | 3/2014 | Mordani | G06F 9/5072 709/224 |
| 2014/0082586 A1* | 3/2014 | Casey | G06F 8/20 717/104 |
| 2014/0282398 A1* | 9/2014 | Podolyak | G06F 8/71 717/121 |
| 2014/0366014 A1* | 12/2014 | Mair | G06F 21/10 717/177 |
| 2016/0139902 A1* | 5/2016 | Dimitrakos | G06F 11/30 717/120 |

OTHER PUBLICATIONS

Cloud Standards Customer Council, "Cloud Computing Use Cases Version 1.0", Oct. 2011, 27 pages.

International Searching Authority, "Notification of Transmittal of the International Search report and The Written Opinion", PCT/US2014/036197, Apr. 8, 2016 13 pages.

McIntyre, J., "IBM Smartcloud: Becoming a Cloud Service Provider", RedGuides for Business Leaders, Dec. 12, 2012. 52 pages.

"International Application Serial No. PCT/US2014/036197, International Preliminary Report on Patentability dated Nov. 10, 2016", 10 pgs.

"International Application Serial No. PCT/US2014/03697, International Search Report dated Apr. 8, 2016", 3 pgs.

"International Application Serial No. PCT/US2014/036197, International Written Opinion dated Apr. 8, 2016", 8 pgs.

* cited by examiner

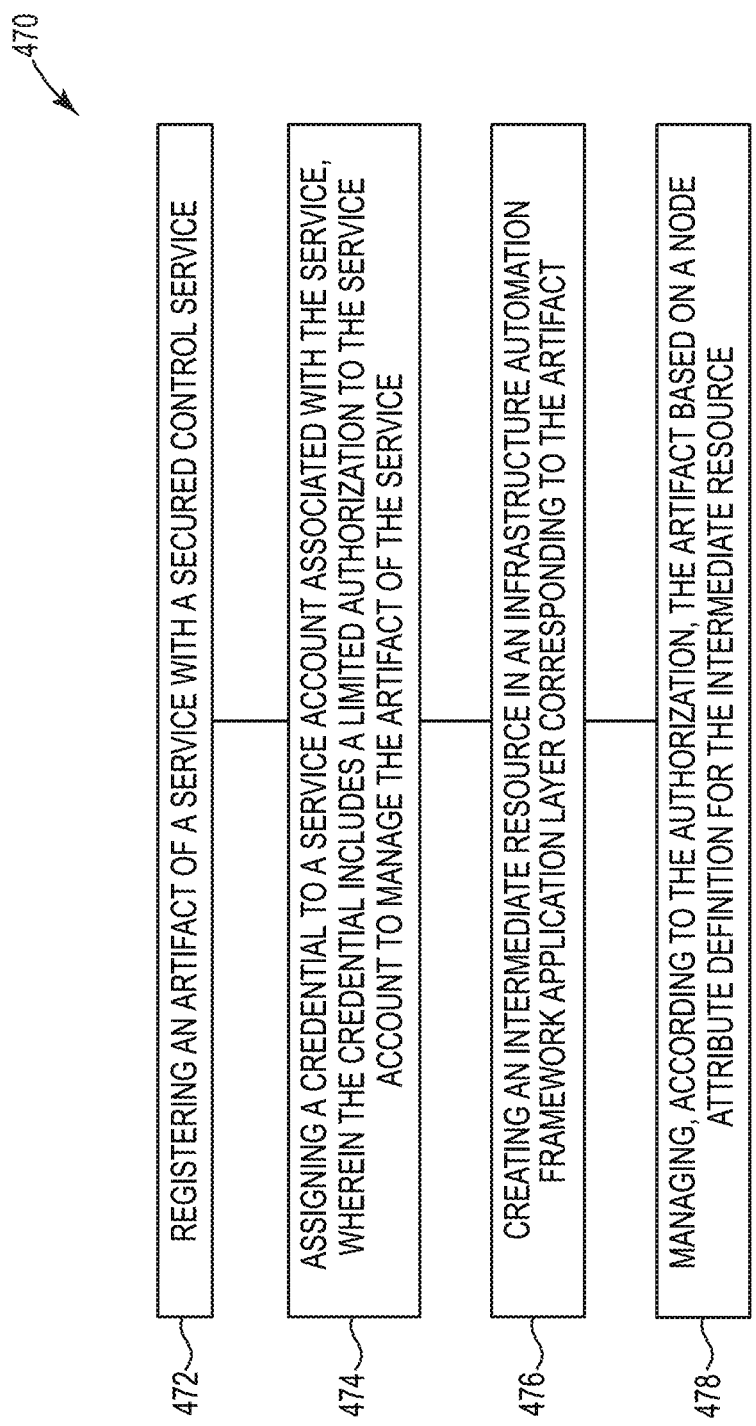

SERVICE ONBOARDING

BACKGROUND

Services can be provided in a computing environment. The environment can be a virtualized computing environment. The services can include infrastructure as a service (IaaS), platform as a service (PaaS), and software as a service (SaaS). End users can find and subscribe to these services via a portal. The services can be cataloged, monitored, and maintained to create a stable service offering.

BRIEF DESCRIPTION OF THE DRAWING

FIG. 4 is a flow chart of an example method for service onboarding according to the present disclosure.

DETAILED DESCRIPTION

A suite of services can be provided in a computing environment. The environment can be a virtualized environment constructed using pooled physical resources accessible over a network (e.g., a cloud). Customers can access the cloud and the associated service via a portal. Customers can be end users and/or service developers. A service can be associated with a service team that develops, modifies, and maintains the service.

Cloud environments and their associated services can be managed by a control service. A control service can be associated with a control service team. A control service can be secured and access to the control service can be limited to the control service team.

In order for a service to be added to the cloud and be visible to end users, the service can be registered with the control service. The services can thereafter be monitored and maintained by the control service team via the control service. Registering a service with the control service and managing the service throughout its lifecycle is typically performed by the control service team with access to the control service. The service being registered can have a service team of its own which is a distinct team from the control services team. The services team of the service being registered may lack access to and/or control of the control service. This arrangement prevents a cloud service team from accidentally or malicious making changes to other services in the environment monitored and/or maintained by the control service.

Registration and lifecycle management of a service can include maintaining and/or modifying service artifacts and their various associated properties for proper functioning of their service. Registration and lifecycle management can be a time consuming process. The suite of services associated with a cloud environment can be voluminous. Registration and lifecycle management of an entire suite of services can create massive backlogs as the service control team attempts to address registration and lifecycle management of the entire suite of services with limited team resources. Often, the control services team for a cloud environment serves as a bottleneck for registering and lifecycle management of the service. For example, the service team associated with a service can decide on changes to the service, but they depend on the control service team to implement the changes. This dependency can result in a delay of hours, days, weeks, or even months until that change can be implemented by the backlogged control service team.

In contrast, the embodiments of the present disclosure describe a system, computer readable medium, and a method for onboarding a service and allowing a service account to manage the service through limited permissions to access portions of the control service.

Figure 1:
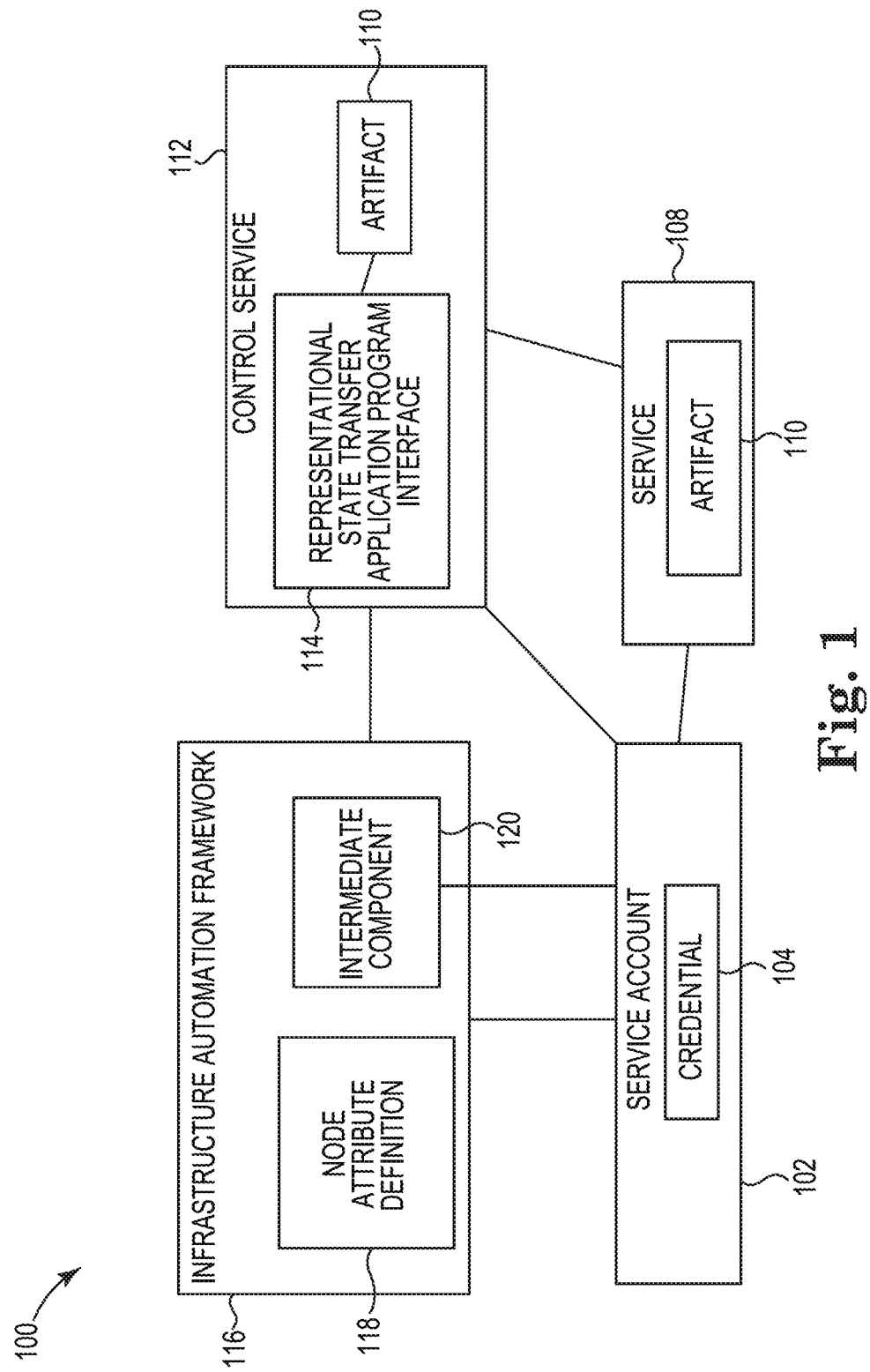
FIG. 1 illustrates an example computing environment for service onboarding according to the present disclosure.

FIG. 1 illustrates an example computing environment for onboarding a service. The computing environment 100 is shown to include a service account 102, a service account credential 104, a service 108, a service artifact 110, a control service 112, a representational state transfer application program interface (REST API) 114, an infrastructure automation framework 116, a node attribute definition 118, an intermediate component 120. The computing environment 100 can exist as a cloud computing environment.

The example computing environment 100 including the service account 102, service account credential 104, service 108, service artifact 110, control service 112, REST API 114, infrastructure automation framework application 116, node attribute definition 118, and the intermediate component 120 can entirely exist with all elements being present in a cloud computing environment. However, embodiments are not so limited and each service account 102, service account credential 104, service 108, service artifact 110, control service 112, REST API 114, infrastructure automation framework 116, node attribute definition 118, and intermediate component 120 can be wholly or partially cloud based. As used herein, the term cloud computing environment is meant to include a virtualized environment constructed using pooled physical resources accessible over a network. The cloud computing environment can include a public cloud system, a private cloud system, and/or a hybrid cloud system for storing, indexing, and/or organizing data. For example, an environment (e.g., IT environment) including a public cloud system and a private cloud system can include a hybrid environment and/or a hybrid cloud system. As used herein, the term public cloud system is meant to include a service provider that makes computational resources (e.g., applications, storage, virtual machines, and/or data), available to the public over the Internet. A public cloud system can be free or offered for a fee, for example.

A private cloud system can include computing architecture that provides hosted services to a limited number of people behind a firewall. For example, a private cloud can include an Enterprise Resource Planning (ERP) system, a number of databases, and virtualization (e.g., virtual machines). As used herein, the term private cloud system is meant to include a computing architecture that provides hosted services to a limited number of a plurality of cloud nodes (e.g., computers) behind a firewall. The ERP, for example, can integrate internal and external management information across an entire load test SaaS application, enterprise, and/or organization. A number of databases can include an event database, event archive, log database, a metric database, a configuration management database (CMDB), and/or a service account database, for example. Virtualization, for example, can include the creation of a number of virtual resources that are allocated from physical resources but not directly limited by the capabilities of particular physical resources. Examples of virtualized resources include hardware platforms, operating systems, storage devices, and/or network resources, among others. For example, a virtual storage device can provide up to a particular capacity of storage that is physically provided by one, less than one, or more than one physical storage device depending on the amount of storage space allocated to the virtual storage device and therefore not directly limited by the capabilities of any particular device(s). The public cloud system and the private cloud system can be bound together, for example, through the application in the public cloud system and the ERP in the private cloud system.

A hybrid cloud, for example, can include a mix of traditional server systems, private cloud systems, public cloud systems, and/or dynamic cloud services. For instance, a hybrid cloud can involve interdependencies between physically and logically separated services consisting of multiple systems. As used herein, the term hybrid cloud is mean to include a number of clouds (e.g., two clouds) that can remain unique entities but can be bound together.

The environment 100 can include a service 108. As used herein the term service is meant to include application software. The service 108 can include an infrastructure as a service (IaaS), a platform as a service (Paas), or software as a service (SaaS). The service 108 can be one of a plurality of services provided in a cloud. The service 108 can be made available to an accessing entity on demand from the cloud. The service 108 can be scalable to meet the request of a given accessing entity by drawing on pooled cloud resources.

The service 108 can include an artifact 110. As used herein, the term artifact 110 is meant to include tangible by-products produced during the development and execution of the service 108. The artifact 110 can describe the function, architecture, and design of the service 108. The artifact 110 can describe the process of developing the service 108 itself. The artifact 110 can describe automated behavior, control sequences, or user-generated content. The artifact 110 can be a deliverable of the service 108.

The artifact 110 can include a service definition of the service 108. As used here, the term service definition is meant to include a specification describing the service 108. A service definition can include a chosen name for the service. A service definition can include a state (e.g., Beta testing, public state, decommissioned, etc.) of the service. A service definition can include a service start date.

The artifact 110 can include a role. As used herein, the term role is meant to include a principle that defines a permission of an accessing entity to access certain data and/or functionality of a service 108. Each service 108 can have a plurality of roles applicable to a plurality of accessing entities. Each role can have a plurality of attributes. For example, a role can include a role name attribute. A role name attribute can include a label for an accessing entity. A role can include a role date attribute. The role date attribute can define windows of time wherein the role is applicable. A role can include a role visibility attribute. A role visibility attribute can include the availability of that role to be visible to an accessing entity. A role can have a role scope attribute. A role scope attribute can include a definition of which, if any, accessing entities have access to the role and/or the power to delegate the role. For example, the role scope can be "public" defining that any accessing entity of the service 108 can access the role. If an accessing entity has a particular role in its service credential then the service 108 can grant that accessing entity access to particular resources associated with the particular role.

The artifact 110 can include an endpoint template. As used herein, the term endpoint template is meant to include a preconfigured set of endpoint attributes applicable to an endpoint. An endpoint template can be instantiated to define a particular endpoint. For example, an endpoint template can define a service region for a service 108, thereby limiting the geographic availability of the service 108. A service 108 can include a plurality of instances of a single endpoint template.

The artifact 110 can include a billing artifact. As used herein, the term billing artifact is meant to include a specification describing an aspect of billing and/or metering for access to resources. For example the billing artifact can include billing rates, special billing rates, billing rate plans, units of billing measure, etc. related to the use of cloud resources.

Each service 108 can be associated with a service team (not illustrated). The service team can include an entity charged with developing and managing the service 108. The service team can be a third party entity with respect to the cloud, the control service 112, and/or a control service team (not illustrated) associated with the control service 112. The service team can lack administrative control over the control service 112 and can rely on the control service 112 (e.g., the control service team via the control service 112) to grant a limited authorization to the service team defining its permissions. The service team can access the cloud via a service account 102. That is, a service account 102 can include the service team.

As used herein, the term service account 102 is meant to include an entity account that defines permissions to interact with a system and its components (e.g., interact with the cloud and its component control service 112). The service account 102 can be associated with a service 108 and, in some examples, include the service 108. For example, the service 108 can be submitted by the service account 102 to become a service offering in the cloud.

The service account 102 can also be associated with and/or include an infrastructure automation framework 116. As used herein, the term infrastructure automation framework 116 is meant to include a configuration management system that configures and/or maintains the configuration of a node. As used herein, the term node is meant to include a physical node, a virtual node, a network node, and/or cloud-based node configured to be maintained by the infrastructure automation framework 116. As used herein, the term physical node is meant to include any active device (e.g., server, virtual machine, etc.) attached to a network that is capable of sending, receiving, and/or forwarding information over a communications channel. As used herein, the term virtual node is meant to include a machine that runs as a software implementation, but otherwise behaves like a physical machine. As used herein, the term network cloud-node is meant to include a networking device (e.g., a switch, a router, a VLAN, etc.). As used herein, the term cloud-based node is meant to refer to an aspect of a cloud service instance that is hosted in an external cloud-based service. A node can include an artifact 110.

The infrastructure automation framework 116 can include a node attribute definition 118. As used herein, the term node attribute definition 118 is meant to include a definition of how a specific part (e.g., node) of a service 108 is built and/or maintained. The node attribute definition 118, when applied to a service 108, can add, configure, modify, and or synchronize an artifact 110 of the service 108 to comply with the definition.

The infrastructure automation framework 116 can be associated with a service account 102. That is, the service account 102 can access and/or control portions of the infrastructure automation framework 116 functionality. For example, the service account 102 can add, delete, and or modify a node attribute definition 118 that is applicable to the service 108 associated with the service account 102. The service account 102, in some examples, can include the infrastructure automation framework 116.

The environment 100 can include a control service 112. As used herein, the term control service 112 is meant to include a cloud management system that provides operational control and automation of cloud resources. For example, the control service 112 can provide identity and access management (IAM). That is, the control service 112 can manage individual digital identities (e.g., service account 102), their authentication, authorization and/or privileges. The control service 112 can also manage provisioning of cloud resources, administration of the cloud, billing, and/or the architecture of the cloud. Managing the architecture of the cloud can include enforcing prerequisites for a service 108 to become a cloud offering. For example, a service 108 can be registered with the control service 112 before it is permitted to become visible on the cloud (e.g., actively accessible by an end user entity). That is, a service 108 can be required to register its artifacts 110 with the control service 112 before it can become a cloud offering. Registering an artifact 110 with the control service 112 can include submitting the artifact 110 to the control service 112 for management by the control service 112. From the point of registration onward, the control service 112 can have complete control over the addition, deletion, modification, and general management of the artifact 110. The process of registering the artifact 110 of a service 108 can be as portion of the service onboarding. The service onboarding process can be an automated process that the user account 102 can initiate and complete. Once registered, the artifact 110 of the service 108 can ostensibly be a resource of the control service 112.

The service account 102 can be restricted from directly accessing, controlling, and/or modifying the control service 112. However, the control service 112 can grant limited authorizations. The control service 112 can create a credential 104 on behalf of a service account 102 associated with a service 108 with registered artifacts 110 and bind an authorization policy with that credential 104. The control service 112 can assign the credential 104 to the service account 102 associated with the service 108. In this manner, the service account 102 can include the credential 104 granted to it from the control service 112. The credential 104 can include a limited authorization to contact an application interface (API) of the control service 112 and take particular actions (e.g., add, modify, delete, etc.) upon a registered artifact 110 of a service 108 associated with the service account 102. In this manner, the credential 104 limits the service account 102 to taking actions with regard to a specific service 108 of a plurality of services registered with the control service 112. Such an arrangement can prevent the service account 102 from accidentally or maliciously disrupting the operation of the plurality of services by modifying their corresponding artifacts.

The control service 112 can include a representational state transfer application program interface (REST API) 114. As used herein, the term REST API 114 can include a specification defining how components (e.g., intermediate component 120 and control service 112) interact with each other. For example, the REST API 114 can include a specification of remote calls (e.g., from the intermediate component 120) exposed to the control service 112 in an architectural style ignoring the details of component implementation and protocol syntax in order to focus on the roles of component, the constraints upon their interactions with other components and their interpretation of significant data elements. The REST API 114 can include a gateway to enter the control service 112 and manipulate the state of the control service 112, or, more specifically, the artifacts 110 registered with the control system 112.

The REST API 114 can be secured. A secured REST API 114 can prevent any external (e.g., external to the control service 112) system and/or process from accessing, without authorization, the control service 112 and/or adding, deleting, or modifying an artifact 110 under control of the control service 112. An external system, such as the infrastructure automation framework 116, can be authorized to access the secured REST API 114 via authenticating a credential. For example, the service account credential 104 can be used by the infrastructure automation framework 116 in placing calls to the secured REST API 114 on behalf of the service account 102.

The infrastructure automation framework 116 can include an intermediate component 120 that can make calls to the REST API 114. The intermediate component 120 can make secured calls over hypertext transfer protocol secure (HTTPS) to the REST API 114 on behalf of the service account 102 by utilizing the credentials 104. Additionally, the intermediate component 120 can make secured calls over hypertext transfer protocol secure (HTTPS) to the REST API 114 via the service account 102. In some examples, the service account 102 can include the intermediate component 120. The intermediate component 120 can include a light weight resource provider (LWRP). A LWRP can extend the infrastructure automation framework 116 allowing custom actions to be defined and executed. A LWRP can include two entities: a lightweight resource and a lightweight provider. A lightweight resource can include a custom resource that defines an action to be completed. The lightweight resource can define the structure and set of actions that can be taken on a targeted resource (e.g., registered artifact 110). The lightweight provider can define implementation to handle each supported by the targeted resource and maintains the targeted resource at the endpoint in an idempotent manner. The lightweight provider can process the actions defined by the lightweight resource. The lightweight providers can be defined to make the secured calls over HTTPS, using the credential 104, to designated REST APIs 114 on behalf of the service account 102.

The intermediate component 120 can abstract a resource of the control service 112. That is, a resource maintained in the control system 112 such as artifact 110 can be abstracted by the intermediate component 120. Abstracting the artifact 110 can include providing a lightweight image proxy for the artifact 110 in a layer provided by the intermediate component 120. For example, a resource (e.g., an endpoint) can be created in the intermediate component 120 wherein that specific resource (e.g., endpoint) is not actually in the intermediate component 120 and that created resource is really a lightweight image proxy. An actual resource (e.g., artifact 110) of the control service 112 can be mapped with the lightweight image proxy of the intermediate component 120 resource. The layer provided by the intermediate component 120 can hide the REST API 114 from the service account 102, thereby providing, from the perspective of the service account 102, a pure infrastructure automation framework 116 solution. Accordingly, a service account 102 can modify a node attribute definition 118 of the infrastructure automation framework 116 which can be directed to the lightweight image proxy of the intermediate component 120. However, based on the mapping, the intermediate component 120 can place a secured call over HTTPS, using the credential 104 of the service account 102, to a REST API 114 of the control service 112 corresponding to the mapped artifact 110. The credential 104 can be authenticated and its limited authorization can be used to determine the allowable actions. If the modification of the node attribute definition 118 corresponds to a permissible action to an artifact 110, wherein the credential 104 is permitted to perform said actions, then the modification to the artifact 110 of the control service 112 can occur. If the modification is impermissible (e.g., an impermissible action, directed toward an artifact 108 that the credential 104 is not permitted to modify, directed toward an artifact 110 corresponding to a service 108 that the credential 104 is not permitted to modify, etc.) by the credential 104 and/or the credential 104 cannot be authenticated, then the execution of the modified node attribute definition 118 can be blocked.

The node attribute definition 118, as discussed above, can include a definition of how a specific part (e.g., node) of a service 108 is bunt and/or maintained. Additionally, the node attribute definition 118 can include a definition of how an artifact 110 should be configured. This can include a definition specifying the addition, deletion, and/or modification of the artifact 110. The node attribute definition 118 can be integrated into the intermediate component 120. For example, the node attribute definition 118 can include definitions for configuring an intermediate component 120 (e.g., LWRP) resource wherein the resource is a lightweight image proxy serving as an abstraction of an artifact 110 registered with the control service 112. The infrastructure automation framework 116 can read and process the lightweight resource and, when it is time to configure the node (e.g., according to node attribute definition 118), can use the corresponding lightweight provider to determine the steps to bring the service 108 into the desired state. Accordingly, the intermediate component 120 can, using the credentials 104 of the service account 102, place a secured call over HTTPS to a REST API 114 of the control service 112 corresponding to the artifact 110 mapped to the intermediate component 120 resource that the node attribute definition 118 addresses. In this manner, the node attribute definition 118 can be used to maintain a specific artifact 110 of the control service 112 according to a limited authorization associated with the credential 104 of the service account 102 maintaining and/or modifying the node attribute definition 118. Therefore, the service account 102 can manage an artifact 110 of the control service 112 without visibility of the REST API 114 and/or without direct access to execute global changes to the control service 112 including any artifacts 110 that are associated with a service 108 unrelated to the service account 102 and to which the service account 102 has no permissions.

Figure 2:
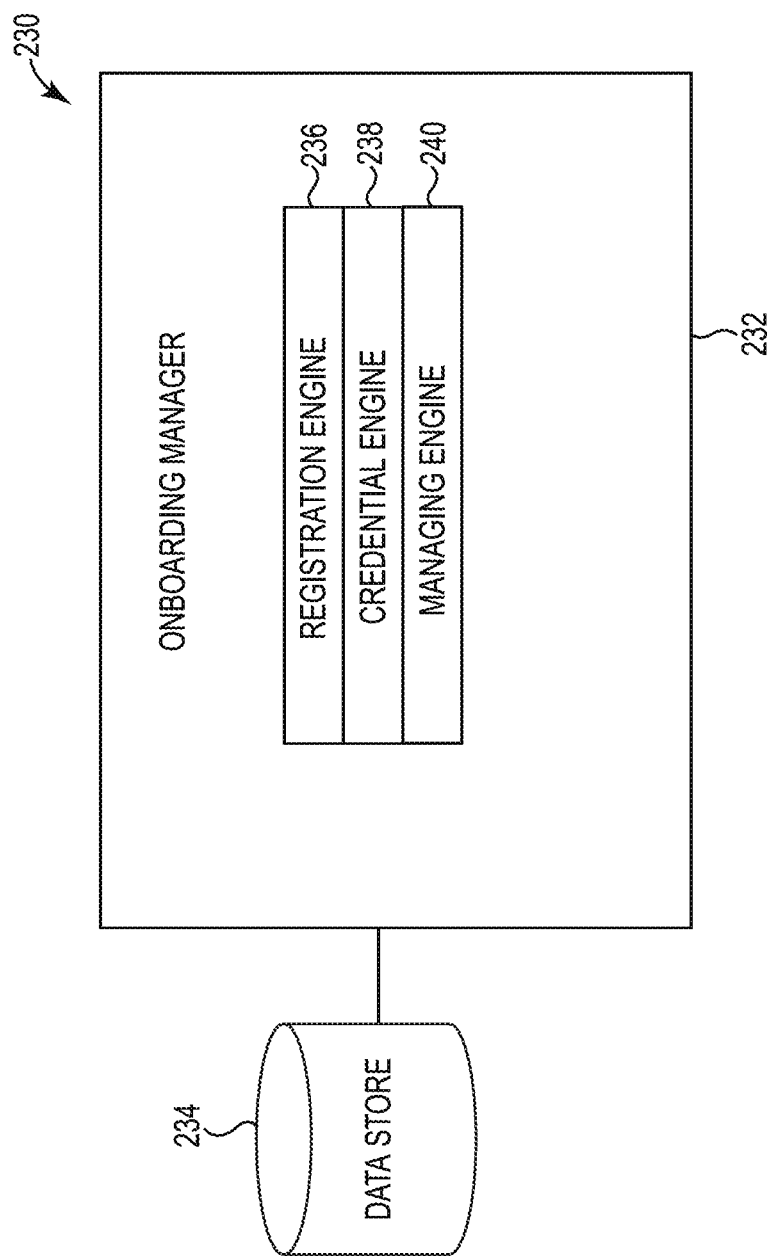
FIG. 2 illustrates a diagram of an example system for service onboarding according to the present disclosure.

FIG. 2 illustrates a diagram of an example system 230 for service onboarding according to the present disclosure. The system 230 can include a data store 234, an onboarding manager 232, and/or a number of engines (e.g., the registration engine 236, the credential engine 238, managing engine 240, etc.). The onboarding manager 232 can be in communication with the data store 234 via a communication link, and can include, manage, and/or employ the number of engines (e.g., the registration engine 236, the credential engine 238, managing engine 240, etc.) to perform various functions. The onboarding manager 232 can include additional or fewer engines than illustrated to perform the various functions described herein.

The number of engines (e.g., the registration engine 236, the credential engine 238, managing engine 240, etc.) can include hardware or a combination of hardware and programming, but at least hardware, to perform a number of functions described herein. For example, the registration engine 236 can register an artifact of a particular service type with a control service. The credential engine 238 can assign a credential to a service account associated with the particular service type, wherein the credential includes a limited authorization that limits actions to the particular service type. The managing engine 240 can manage, according to the limited authorization, a life cycle of the service based on a node attribute definition maintained be an infrastructure automation framework, wherein the infrastructure automation framework includes a component to make a call to a representational state transfer (REST) application program interface (API) of the control service. The programming can include program instructions (e.g., software, firmware, etc.) stored in a memory resource (e.g., computer readable medium, machine readable medium, etc.) as well as hardwired program (e.g., logic).

The registration engine 236 can register an artifact of a particular service type with a control service. A service can include an instance of a cloud-based application offering. A service type can include a type of cloud-based application offering. For example, a service type can include an object storage service type, a relational database service type, a bad balancing service type, etc. Each service type can include at least one artifact.

The artifact can include a specification of the function, architecture, and/or design of a service. The artifact can include various associated properties. The artifact can allow for proper functioning of the service within a cloud environment. Monitoring an artifact and maintaining it in line with the included specification can allow for proper functioning of the service within the cloud environment.

Registering an artifact with the control service can include submitting an artifact of the service to the control service for registration. Submitting the artifact can include creating and or configuring the artifact as a resource of the control service. In this manner to register the artifact can include adding the artifact to the control service where it will be maintained as a control service resource.

The control service can comprise a cloud management system that provides operational control and automation of cloud resources. The service can provide identity access management (IAM) and/or handle the provisioning of the cloud resources.

Registering a service artifact with a control service can be a prerequisite to become a cloud offering. That is, a service may need to register its artifacts before it can become visible to end users in a cloud environment.

The service can be associated with a service account. For example, a service account can include an entity account that carries with it specific permissions within the cloud. The service account can be affiliated with a service team that develops and manages the service. As such, actions taken with regard to developing and managing the service can be conveyed and/or executed via a service account. In some examples, the service account can include the infrastructure automation framework.

The service account can submit the service for registration of the artifacts with the control service. The control service can analyze the submission and recognize that the service account is submitting the service and/or that the service account is associated with the service.

The credential engine 238 can assign a credential to the service account associated with the particular service type. The credential can be assigned by a component of the control service. Assigning the credential can include cataloging information associated with the service account, exchanging tokens, and/or cataloging an association between the service account and the service with registered artifacts. The credentials can include a limited authorization that limits the actions to the particular service type. For example, the credential can include permissions that limit the amount of actions that a service account can take with regard to the control service. The permissions can also limit the permissible actions to certain artifacts of the control service (e.g., those registered artifacts from the service associated with the service account). The credentials can include permissions that, when received from a infrastructure automation framework placing a secured call on behalf of the service account to a REST API of the control service, define what actions can be taken to which control service artifacts to effect a node attribute definition.

The management engine 240 can manage, according to the authorization, a life cycle of the service based on a node attribute definition maintained by an infrastructure automation framework, wherein the infrastructure automation framework includes a component to make a call to a REST API of the control services. Managing a life cycle of a service can include managing the service artifacts registered with the control service during and/or after registering the artifacts. Managing a life cycle of a service can include adding, deleting, modifying, syncing, configuring, and or reconfiguring artifacts throughout the life time of a service. The managing can be performed in response to a life cycle event (e.g., a business event precipitating a change and/or other action request by a service account). For example, due to increased demand for a service the service account can configure a node attribute definition to add an artifact (for example a new role that can be utilized by an end user) to address the increased demand to the control service where it will be maintained.

Additionally, the managing can be performed periodically. For example, the managing can include periodically checking the configuration of an artifact registered with the control service against a node attribute definition to confirm the configuration and/or bring the configuration into specification with the node attribute definition. Managing, as discussed above, can be done according to the authorization. That is, the management of the artifacts can be confined to those actions permissible under the permissions associated with a credential of the service account. For example, the managing can include execution of only the actions permissible under the service account credentials.

The infrastructure automation framework can include a configuration management system that configures and/or maintains configuration of a node such as the artifact registered with the control service. However, the infrastructure automation framework may not have direct global access to the control service. The infrastructure automation framework can manage configurations according to a node attribute definition. The infrastructure automation framework can include the CHEF configuration management tool offered by Chef.

A node attribute definition can include a specification of how an artifact should be built and/or maintained. The node attribute itself can be classified as a recipe for how to handle artifact configuration. The node attribute can be maintained by the infrastructure automation framework. An infrastructure automation framework can maintain the node attribute definition by storing the recipe in what can be classified as a cookbook (e.g., a collection of node attribute definitions) of the infrastructure automation framework. An infrastructure automation framework can maintain the node attribute definition by accessing the saved node attribute definition. The node attribute definition can be configured and/or modified by the service account. The node attribute definition can thereafter be used to specify the management of the service artifacts registered with the control service on behalf of the service account. As described above, the actions necessary to effect the artifact configuration specified by the node attribute definition will only be executed to the extent permissible by the credential granted from the control service.

The infrastructure automation framework can include a component to make a call to a REST API of the control service to manage the service artifacts registered with the control service in accordance with the node attribute definition specified by the service account. The component can make a secure call over a hypertext transfer protocol secure (HTTPS) connection to a designated REST API of the control system. The component can include a light weight resource provider (LWRP). As used herein, the LWRP includes a light weight resource that defines an action to be taken on a resource and a lightweight provider that defines an implementation to handle the action supported by the resource and maintains the resource at an endpoint in an idempotent manner. The LWRP resource can be a lightweight proxy image abstraction mapped (e.g., designating a corresponding REST API of the control service) to the artifact of the service that is registered and maintained in the control service as a control service resource.

Figure 3:
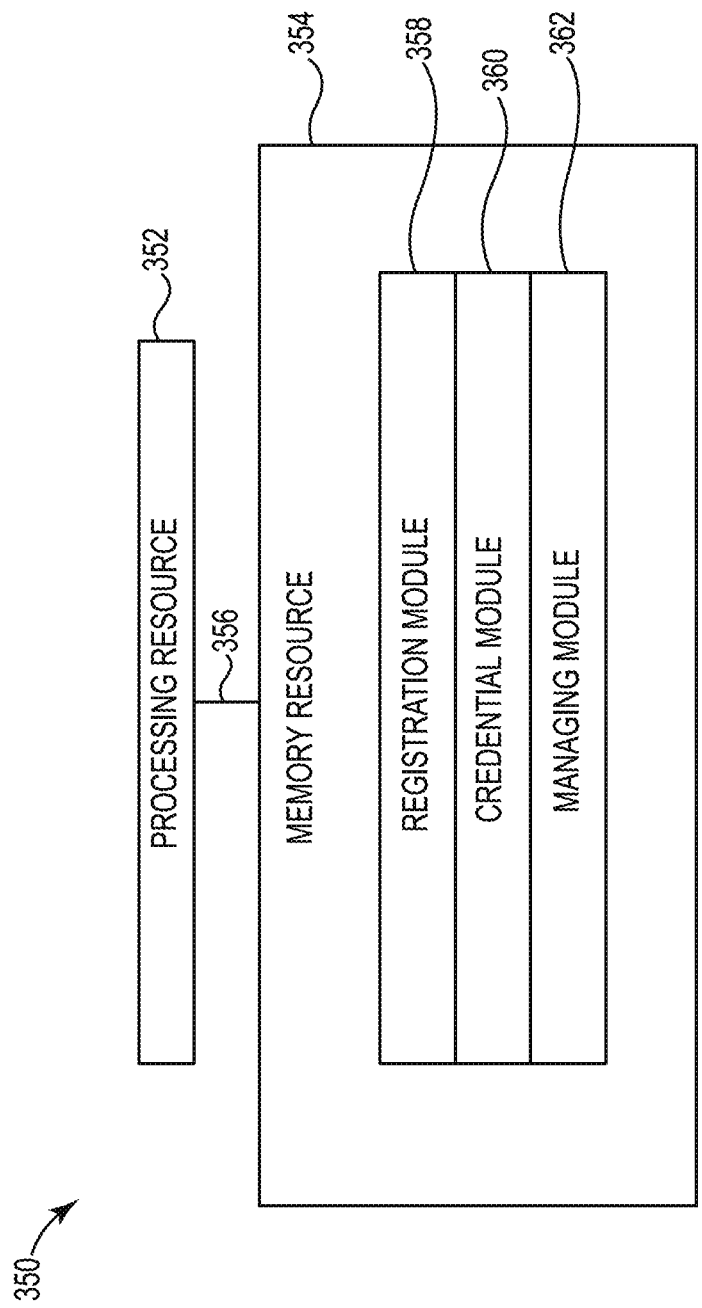
FIG. 3 illustrates a diagram of an example computing device according to the present disclosure.

FIG. 3 illustrates a diagram of an example of a computing device 350 according to the present disclosure. The computing device 350 can utilize software, hardware, firmware, and/or logic to perform a number of functions described herein. The computing device 350 can be any combination of hardware and program instructions to share information. The hardware, for example, can include a processing resource 352 and/or a memory resource 354 (e.g., computer-readable medium (CRM), machine readable medium (MRM), database, etc.). A processing resource 352, as used herein, can include any number of processors capable of executing instructions stored by a memory resource 354. The processing resource 352 may be implemented in a single device or distributed across multiple devices. The program instructions (e.g., computer readable instructions (CRI)) can include instructions stored on the memory resource 354 and executable by the processing resource 352 to implement a desired function (e.g., register an artifact of a service with a control service; assign a credential to a service account associated with the service, wherein the credential includes a limited authorization of the service account to manage the artifact of the service maintained in the control system; manage, according to the authorization, the artifact of the service maintained in the control service based on a node attribute definition maintained by an infrastructure automation framework associated with the service account, wherein the infrastructure automation framework includes a component to make a call to a representational state transfer (REST) application program interface (API) of the control service, etc.).

The memory resource 354 can be in communication with a processing resource 352. A memory resource 354, as used herein, can include any number of memory components capable of storing instructions that can be executed by the processing resource 352. The memory resource 354 can be a non-transitory CRM or MRM. The memory resource 354 may be integrated in a single device or distributed across multiple devices. Further, the memory resource 354 may be fully or partially integrated in the same device as the processing resource 352 or it may be separate but accessible to that device and the processing resource 352. Thus, it is noted that the computing device 350 may be implemented on a participant device (e.g., host), on a server device, on a collection of server devices, and/or a combination of the participant device and the server device.

The memory resource 354 can be in communication with the processing resource 352 via a communication link (e.g., a path) 356. The communication link 356 can be local or remote to a machine (e.g., a computing device) associated with the processing resource 352. Examples of a local communication link 356 can include an electronic bus internal to a machine (e.g., a computing device) where the memory resource 354 is one of volatile, non-volatile, fixed, and/or removable storage medium in communication with the processing resource 352 via the electronic bus.

FIG. 3 includes a number of modules (e.g., registration module 358, credential module 360, managing module 362, etc.) that can include CRI that when executed by the processing resource 352 can perform a number of functions. The number of modules can be combined or can be sub-modules of other modules. For example, the credential module 360 and the managing module 362 can be sub-modules and/or contained on the same computing device. In another example, the number of modules can comprise individual modules located on separate and distinct memory resources (e.g., CRM, etc.).

Each of the number of modules includes hardware, logic, software and hardware, but at least can include instructions that when executed by the processing resource 352 can function as a corresponding engine, including those as described herein. For example, the registration module 358 can include instructions that when executed by the processing resource 352 can function as the registration engine 236. The credential module 360 can include instructions that when executed by the processing resource 352 can function as the credential engine 238. The managing module 362 and/or the proposing module can include instructions that when executed by the processing resource 352 can function as the managing engine 240.

The registration module 358 can include CRI that when executed by the processing resource 352 can register an artifact of a service with a control service. The artifact can include at least one of a service definition, an endpoint template, and a role specification for the service. Registering the artifact can include submitting the artifact to the control service to be maintained as a resource of the control service.

The credential module 360 can include CRI that when executed by the processing resource 352 can assign a credential to a service account associated with the service, wherein the credential can include a limited authorization of the service account to manage the artifact of the service maintained in the control system. For example, a control service component can assign a credential to a service account associated with the service corresponding to the artifact registered with the control service. The credential can include a limited authorization that limits the actions to the particular service type. For example, the credential can include permissions that limit the amount and/or type of actions that a service account can take with regard to the control service. The permissions can also limit the permissible actions to certain artifacts of the control service (e.g., the only permissible actions are those to artifacts registered from the service associated with the service account). The credentials can include permissions that, when received from a infrastructure automation framework placing a secured call on behalf of the service account to a REST API of the control service, define what actions can be taken to which control service artifacts to effect a node attribute definition.

The managing module 362 can include CRI that when executed by the processing resource 352 can manage, according to the authorization, the artifact of the service maintained in the control service based on a node attribute definition maintained by an infrastructure automation framework associated with the service account, wherein the infrastructure automation framework includes a component to make a call to a representational state transfer (REST) application program interface (API) of the control service. Managing an artifact of the service can include adding, deleting, modifying, syncing, configuring, and or reconfiguring the service artifact registered with the control service throughout the life time of a service. The managing can be performed in response to a life cycle event (e.g., a business event precipitating a change and/or other action request by a service account). For example, due to increased demand for a service the service account can modify the artifact registered and/or maintained by the control service by altering a node attribute definition maintained, on behalf of the service account, by the infrastructure automation framework (for example modifying a role that can be utilized by an end user) to address the increased demand.

FIG. 4 is a flow chart of an example of a method 470 of service onboarding according to the present disclosure. Method 470 can be performed by a computing device (e.g., computing device 350, previously described in connection with FIG. 3), for example.

At 472 the method 470 can include registering an artifact of a service with a secured control service. A secured control service can include security policies. The secured control service can grant administrative rights to a control service team wherein the control service team is separate from the service account. The control service team can be one of the only entities with the proper permissions to directly access, control, and/or modify the control service and any one of the plurality of registered artifacts associated therewith. However, the control service can grant limited authorizations. The control service can create a credential for a service account associated with a service with registered artifacts and bind an authorization policy with that credential. In this manner, the service account can gain access to limited amounts of control of the control service artifacts through the limited authorization service control portals associated with their credentials.

At 474 the method 470 can include assigning a credential to a service account associated with the service, wherein the credential includes a limited authorization to the service account to manage the artifact of the service maintained in the control service. The credential can include a limited authorization to contact an application interface (API) of the control service and take particular actions (e.g., add, modify, delete, etc.) upon an artifact associated with the service account and registered with the control service. In this manner, the credential limits the service account to taking actions with regard to a specific service of a plurality of services registered with the control service. Such an arrangement can prevent the service account from accidentally or maliciously disrupting the operation of a plurality of services registered with the control service by modifying their corresponding artifacts.

At 476 the method 470 can include creating an intermediate resource in an infrastructure automation framework application layer wherein the intermediate resource corresponds to the artifact. The infrastructure automation framework can include an intermediate component. The intermediate component can include a light weight resource provider (LWRP). A LWRP can extend the infrastructure automation framework allowing custom actions to be defined and executed. A LWRP can include two entities: a lightweight resource and a lightweight provider. A lightweight resource can include a custom resource that defines an action to be completed. The lightweight resource can define the structure and set of actions that can be taken on a targeted resource (e.g., artifact). The lightweight provider can define implementation to handle each action supported by the targeted resource and maintains the targeted resource at the endpoint in an idempotent manner. The intermediate component can abstract a resource of the control service. That is, a resource maintained in the control system such as artifact can be abstracted by the intermediate component. Abstracting the artifact can include providing a lightweight image proxy for the artifact in a layer provided by the intermediate component. For example, an intermediate resource (e.g., an endpoint) can be created in the intermediate component wherein that specific resource (e.g., endpoint) is not actually in the intermediate component and that created resource is really a lightweight image proxy. An actual resource (e.g., artifact) of the control service can be mapped with the lightweight image proxy intermediate resource.

At 478 the method 470 can include managing, according to the authorization, the artifact of the service maintained in the control system based on a node attribute definition for the intermediate resource maintained by the infrastructure automation framework application, wherein the infrastructure automation framework application includes a light weight resource provider component to make a call to a representational state transfer (REST) application program interface (API) of the control service. The infrastructure automation framework application can additionally maintain a secured connection with a plurality of other services and directly manage artifacts of the plurality of other services via infrastructure automation framework application client agents on the plurality of other services. In this manner, the service account is able to directly manage and/or maintain a plurality of services, but is also able to manage and maintain a service through the control service in accordance with its limited permissions.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, "a" or "a number of" something can refer to one or more such things.

What is claimed:

1. A system of service onboarding, comprising:
a hardware processor configured to execute executable instructions from a non-transitory computer-readable storage medium, the executable instructions representing a registration engine, a credential engine, and a managing engine;
the registration engine configured to register an artifact of a particular service type with a control service, wherein the artifact describes: a function, an architecture, a design of a service associated with the particular service type, a process of developing the service, automated behavior, control sequences, generated content produced by the service, and a role for accessing the service, and wherein the role includes a role attribute that defines a time that the role is to be active for the service;
the credential engine configured to assign a credential to a service account associated with the particular service type, wherein the credential includes a limited authorization that limits actions to the particular service type; and
the managing engine configured to configure, according to the authorization, a service over the course of a life cycle based on a node attribute definition maintained by an infrastructure automation framework, wherein the infrastructure automation framework includes a component to make a call to a representational state transfer (REST) application program interface (API) of the control service;
wherein the control service is an access management and provisioning service on a cloud.

2. The system of claim 1, wherein to register with the control service is a prerequisite for service visibility on the cloud to an end user.

3. The system of claim 1, wherein the component is a light weight resource provider.

4. The system of claim 3, wherein the light weight resource provider includes a lightweight resource that defines an action that can be taken on a resource and a lightweight provider that defines an implementation to handle the action supported by the resource and maintains the resource at an endpoint in an idempotent manner.

5. The system of claim 4, wherein the resource is mapped to the artifact of the particular service type that is maintained in the control service.

6. The system of claim 1, wherein the component makes a secure call over a hypertext transfer protocol secure connection to a designated REST API of the control service.

7. The system of claim 1, wherein to register the artifact of the particular service type with the control service includes adding the artifact to the control service where it will be maintained.

8. The system of claim 1, wherein to configure, according to the authorization, a service over the course of a life cycle of the particular service type includes to create an artifact in the control service by altering the node attribute definition maintained by an infrastructure automation framework.

9. A non-transitory computer readable medium storing instructions executable by a processing resource to cause a computer to:
register an artifact of a service with a control service by registering an artifact of a particular service type with the control service, wherein the artifact describes: a function, an architecture, a design of the service associated with the particular service type, a process of developing the service, automated behavior, control sequences, generated content produced by the service, and a role for accessing the service, wherein the role includes a role attribute that defines a time that the role is to active for the service;
assign, by the control service, a credential to a service account associated with the service having the particular service type, wherein the credential includes a limited authorization of the service account to manage the artifact of the service maintained in the control service, and wherein the limited authorization limits actions to the particular service type for the service;

manage, by the control service and according to the authorization, the service and the artifact of the service based on a node attribute definition maintained by an infrastructure automation framework associated with the service account, wherein the service and the artifact are managed over a life cycle of the service, and wherein the node attribute definition is a definition of how a specific node of the service is built and maintained, and wherein the specific node is one of: a physical node, a virtual node, a network node, and a network cloud node that processes an includes the service on the specific node, and wherein the control service manages the service based on role attributes for a role assigned to the service, at least one role attribute managed to determine when the role is to be visible to an accessing entity that accesses the service; and wherein the infrastructure automation framework includes a component to make a call to a representational state transfer (REST) application program interface (API) of the control service;

wherein the control service is an access management and provisioning service on a cloud.

10. The non-transitory computer readable medium of claim 9, wherein the artifact includes at least one of a service definition and an endpoint template.

11. The non-transitory computer readable medium of claim 9, wherein to manage the artifact includes to modify a state of the artifact maintained by the control service by altering the node attribute definition maintained by the infrastructure automation framework.

12. A method of service onboarding, comprising:
registering an artifact of a service of a particular service type with a control service, wherein the artifact a function, an architecture, a design of the service associated with the particular service type, a process of developing the service, automated behavior, control sequences, generated content produced by the service, and a role for accessing the service, and wherein the role includes a role attribute that defines a time that the role is to be active for the service; a secured control service;

assigning, by the control service, a credential to a service account associated with the service having the particular service type, wherein the credential includes a limited authorization to the service account to manage the artifact of the service maintained in the control service;

creating an intermediate resource in an infrastructure automation framework application layer wherein the intermediate resource corresponds to the artifact, and wherein the intermediate resource defines a service region for the service that limits geographic availability of the service to the service region;

managing according to the authorization, the service and the artifact of the service maintained in the control system based on a node attribute definition for the intermediate resource maintained by the infrastructure automation framework application, wherein managing further includes managing the service over the course of a life cycle, wherein managing further includes managing the service by controlling when an accessing entity that is accessing the service has access to the role assigned to the artifact and a power to delegate the role based on a role scope attribute assigned to the role; and wherein the infrastructure automation framework application includes a light weight resource provider (LWRP) component to make a call to a representational state transfer (REST) application program interface (API) of the control service;

wherein the control service is as an access management and provisioning service on a cloud.

13. The method of claim 12, wherein the intermediate resource is an abstraction of the artifact provided by a light weight resource provider layer associated with the infrastructure automation framework application.

14. The method of claim 12, wherein the infrastructure automation framework application maintains a secured connection with a plurality of other services and directly manages the artifact of the service on the plurality of other services via infrastructure automation framework application client agents on the plurality of other services.

* * * * *

UNITED STATES PATENT AND TRADEMARK OFFICE
CERTIFICATE OF CORRECTION

PATENT NO. : 10,356,155 B2
APPLICATION NO. : 15/120424
DATED : July 16, 2019
INVENTOR(S) : Tiwari et al.

Page 1 of 1

It is certified that error appears in the above-identified patent and that said Letters Patent is hereby corrected as shown below:

On the Title Page

In item (72), in "Inventors", in Column 1, Line 4, delete "For" and insert --Fort-- therefor On page 2, in Column 2, under "Other Publications", Line 11, delete "PCT/US2014/03697," and insert --PCT/US2014/036197,-- therefor Signed and Sealed this
Second Day of February, 2021

Drew Hirshfeld
*Performing the Functions and Duties of the*
*Under Secretary of Commerce for Intellectual Property and*
*Director of the United States Patent and Trademark Office*